Jan. 12, 1926.
E. H. SIPPEL ET AL
1,569,586
IGNITER TESTING DEVICE
Filed August 27, 1920
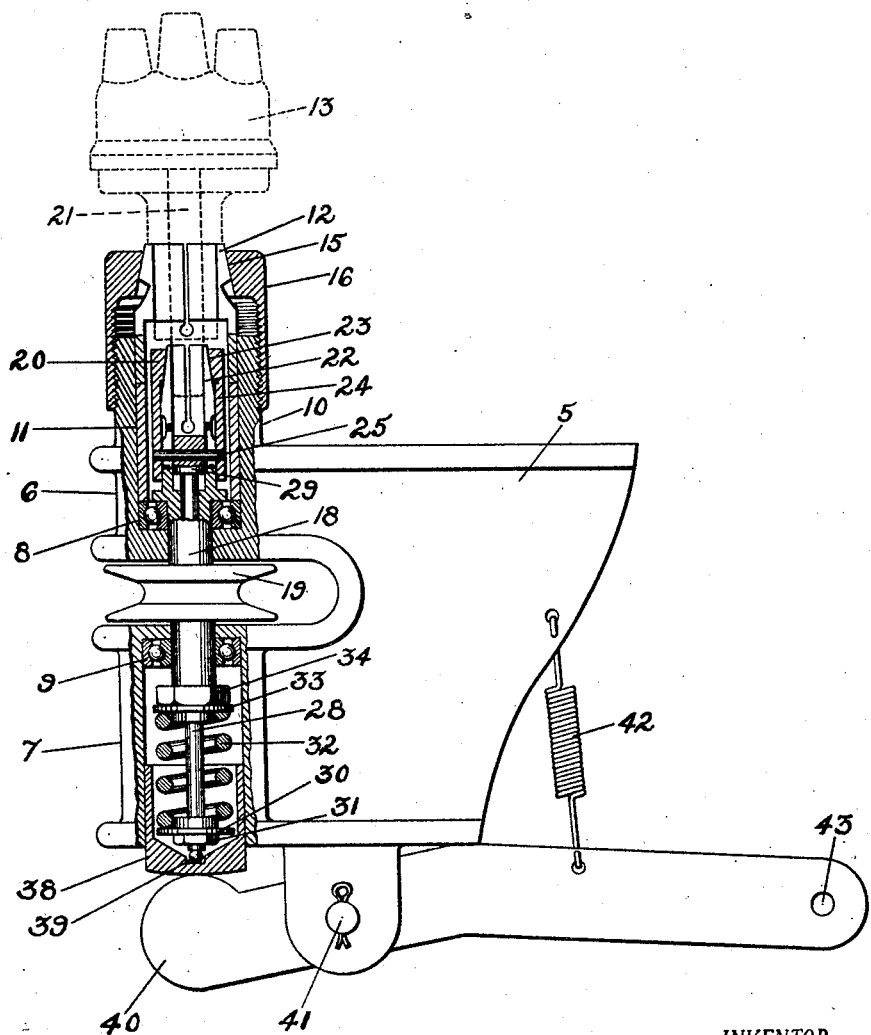
INVENTOR.
Ernest H. Sippel
Harold A. Hancox
BY Chester H. Braselton
ATTORNEY.

Patented Jan. 12, 1926.

1,569,586

UNITED STATES PATENT OFFICE.

ERNEST H. SIPPEL AND HAROLD A. HANCOX, OF TOLEDO, OHIO, ASSIGNORS, BY MESNE ASSIGNMENTS, TO THE ELECTRIC AUTO-LITE COMPANY, OF TOLEDO, OHIO, A CORPORATION OF OHIO.

IGNITER-TESTING DEVICE.

Application filed August 27, 1920. Serial No. 406,467.

*To all whom it may concern:*

Be it known that we, ERNEST H. SIPPEL and HAROLD A. HANCOX, citizens of the United States, residing at Toledo, county of Lucas, and State of Ohio, have invented certain new and useful Improvements in Igniter-Testing Devices, of which we declare the following to be a full, clear, and exact description.

This invention relates to devices used in testing igniters such as those commonly employed as a part of the ignition systems of internal combustion engines and it is an object of our invention to provide a device of that nature which shall be simple, reliable, easy of operation and convenient for the operator whereby the testing operations may be carried on rapidly, as little time as possible being lost in removing one igniter and substituting another.

Further objects of this invention relate to economies of manufacture and details of construction as will hereinafter appear from the detailed description to follow. We accomplish the objects of our invention in one instance by the devices and means described in the following specification, but it is evident that the same may be varied widely without departing from the scope of the invention as pointed out in the appended claims. A structure constituting one embodiment of our invention, which may be the preferred, is illustrated in the accompanying drawings forming a part hereof, in which:

The single figure in the drawing is a side elevation, partly in section, of a device illustrating the invention.

In the drawing a frame 5, adapted to be secured to a bench or other suitable support, has a pair of bearing heads 6 and 7 provided, respectively, with ball bearings 8 and 9. The upper bearing head 6 has an upward extension 10 which is exteriorly screw-threaded and has a cylindrical bore 11. In the bottom of this bore the bearing 8 is suitably secured and in the upper portion is mounted a clutch member 12 for holding the frame or casing of an igniter 13 which is to be tested. This clutch member 12 is shown having a split upper end and as having a tapered portion 15 adapted to be engaged by a nut 16 having a corresponding tapered portion and being screw-threaded to engage the threaded portion of the extension 10. A shaft 18 carrying a pulley 19 is journaled in the ball-bearings 8 and 9 and carries at its upper end a clutch 20 for engaging the shaft 21 of the igniter which shaft projects a short distance below the end of the igniter frame, the igniter and its shaft being shown by dotted lines only in the drawing. The clutch 20 is somewhat similar to that already described inasmuch as the shaft 18 has a split end 22 and a tapered outer surface 23 which is engaged by a sleeve 24 having a corresponding tapered portion and in which is mounted a pin 25 by means of which it may be moved longitudinally to contract the split end 22. Extending longitudinally through the shaft 18 is a rod 28 having at its upper end a head 29 through which extends the pin 25 and carrying a washer 30 and nut 31 at its lower end. A compression spring 32 is provided between the washer 30 and a similar washer 33 backed by a nut 34 on shaft 18. The purpose of this spring 32 is to normally hold the sleeve 24 in its lowermost position to cause the split end of the shaft 18 to engage the end of the igniter shaft to rotate the same but to permit it to slip in the event that undue resistance is met with.

In order to release the igniter shaft when it is desired to remove the igniter, a manual device is provided which will now be described: A cup-shaped member 38 loosely fits into the opening in the lower bearing head 7 provided for the bearing 9 and in the bottom of this member is a ball 39 against which rests the lower end of the rod 28. A lever 40 pivoted at 41 to the frame 5 and also connected to the frame by a tension spring 42 is adapted to be suitably connected to a treadle at the end 43 and operated to raise the rod 18 through the medium of the member 38 and ball 39 to release the clutch. This lever 40, as will be apparent from the drawing, is normally in the position illustrated wherein the shaft of the igniter is operatively connected to the shaft 18.

In the use of this device a completed igniter is applied by rotating the nut 16 by hand to permit the clutch member 12 to open and thereafter tightening the same to hold the igniter firmly in position. At the same time the lever 40 is held in operative position against the force of the spring 42 as by holding the foot upon the treadle to thereby permit the split end 22 of the shaft 18 to assume its normal open position.

The igniter having been secured as above described and the igniter shaft having entered the split end of the shaft 18, the lever 40 is released and the igniter shaft is immediately gripped and rotated by the constantly rotating shaft 18. It is to be noted that by means of this device the operator has only the nut 16 to manipulate with his hands and as soon as the igniter is secured in position a single movement of the treadle immediately starts the igniter shaft in operation and conversely when the test is completed another movement of the treadle releases the connection between the igniter shaft and the driving shaft.

The invention as hereinabove described has particular utility in bringing out the characteristics of the igniter unit prior to its application to an automobile or other auto vehicle in actual use. By means of the power pulley, the igniter is tested for mechanical strength at the rotary speeds normally employed in use and also the electrical characteristics of the igniter are brought out, particularly the action of the same under high tension currents. If undue leakage arising from defective insulation is discovered the deficiency may be rectified before the device is installed on an automobile or other similar mechanism.

Inasmuch as the invention herein disclosed is susceptible of various other embodiments and as various changes might be made in the embodiment set forth, it is to be understood that all matter described above or shown in the accompanying drawing is to be interpreted as illustrative only, and not in a limiting sense.

Having thus described our invention, what we claim as new and desire to secure by Letters Patent, is:

1. In an igniter testing device, the combination of a frame, a clutch carried thereby adapted to engage and hold the frame or casing of an igniter, a shaft rotatably mounted in said frame, a clutch at one end of said shaft adapted normally to engage the shaft of said igniter, means for rotating said first-mentioned shaft and manually controlled means for releasing said clutch during the rotation thereof.

2. In an igniter testing device, the combination of a frame, a manually operable clutch mounted thereon for engaging and holding an igniter to be tested, a shaft journaled in said frame, a clutch at one end of said shaft for engaging the shaft of said igniter, a rod extending through said first shaft to operate said clutch, a spring between said shaft and said rod tending to hold said clutch in operative position, and a manually operable lever for moving said rod against said spring to cause said clutch to release the igniter shaft.

3. In an igniter testing device, the combination of a frame having upper and lower bearing heads, a shaft journaled therein, a drive pulley on said shaft between said heads, an extension on said upper head coaxial with said shaft, a clutch carried by said extension for holding an igniter during a test, a clutch on the upper end of said shaft adapted to engage the igniter shaft, a rod extending through said shaft for operating said second clutch, a spring co-operating with said rod to move it in one direction, and a manually operable lever for moving said rod in the opposite direction.

4. In an igniter testing device, the combination of a frame, and a plurality of clutches positioned on said frame for engaging and holding relatively movable parts of an igniter, one of said clutches being yieldingly held in normal position.

5. In an igniter testing device, the combination of a frame, and a plurality of clutches positioned on said frame for engaging and holding relatively movable parts of an igniter, one of said clutches being yieldingly held in normal position and one of said clutches being non-yieldingly held in clutching position.

6. In an igniter testing device, the combination of a frame, a plurality of clutches positioned on said frame for engaging and holding relatively movable parts of an igniter, one of said clutches being yieldingly held in normal position and means for rotating said clutches.

7. In an igniter testing device, the combination of a frame, a clutch on said frame adapted to engage and hold the casing of an igniter, a second clutch on said frame adapted to hold the shaft of an igniter, said last named clutch being yieldingly held in normal position.

8. In an igniter testing device, the combination of a frame, a clutch positioned on said frame for engaging and holding the casing of an igniter, a second clutch on said frame for engaging and holding the shaft of an igniter, said last mentioned clutch being yieldingly held in normal position and said first named clutch being non-yieldingly held in clutching position.

9. In an igniter testing device, the combination of a frame, a clutch positioned on said frame for engaging and holding the casing of an igniter, a second clutch on said frame for engaging and holding the shaft of an igniter, said last mentioned clutch being yieldingly held in normal position and said first named clutch being non-yieldingly held in clutching position, and means for rotating said clutch.

In testimony whereof we affix our signatures.

ERNEST H. SIPPEL.
HAROLD A. HANCOX.